J. Parham, Jr.
Well Packing.

N° 49,783.

Patented Sept. 5, 1865.

Witnesses:
Jno. D. Patten
C. H. Fowler

Inventor
John Parham Jr.
By atty. A. B. Stoughton

UNITED STATES PATENT OFFICE.

JOHN PARHAM, JR., OF PHILADELPHIA, PENNSYLVANIA.

IMPROVEMENT IN PACKING FOR OIL-WELL TUBES.

Specification forming part of Letters Patent No. 49,783, dated September 5, 1865.

*To all whom it may concern:*

Be it known that I, JOHN PARHAM, Jr., of the city and county of Philadelphia, and State of Pennsylvania, have invented a new and useful Improvement in India-Rubber Cup-Packing for Oil-Wells; and I do hereby declare the following to be a full, clear, and exact description of the same, reference being had to the accompanying drawings, making a part of this specification, in which—

Figure 1:
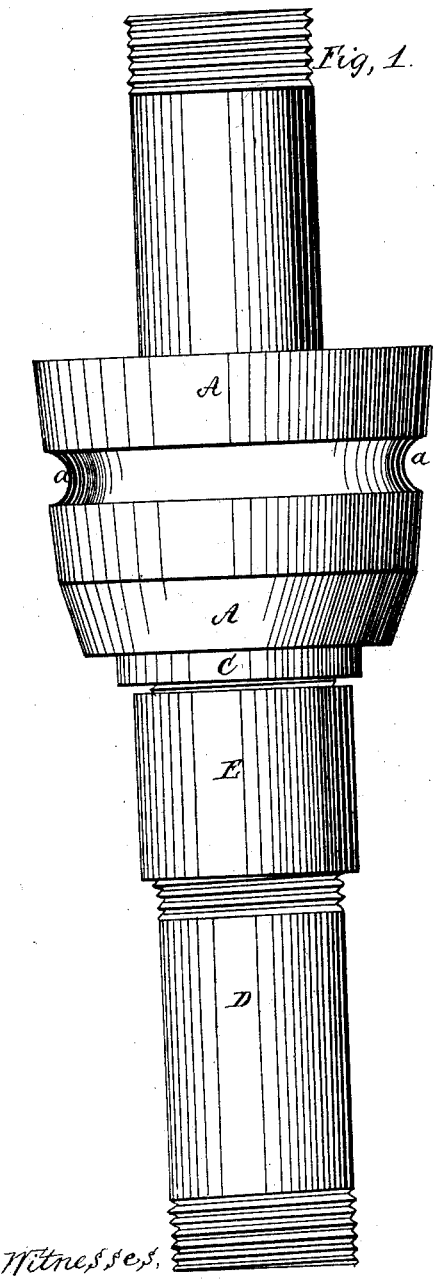
Figure 2:
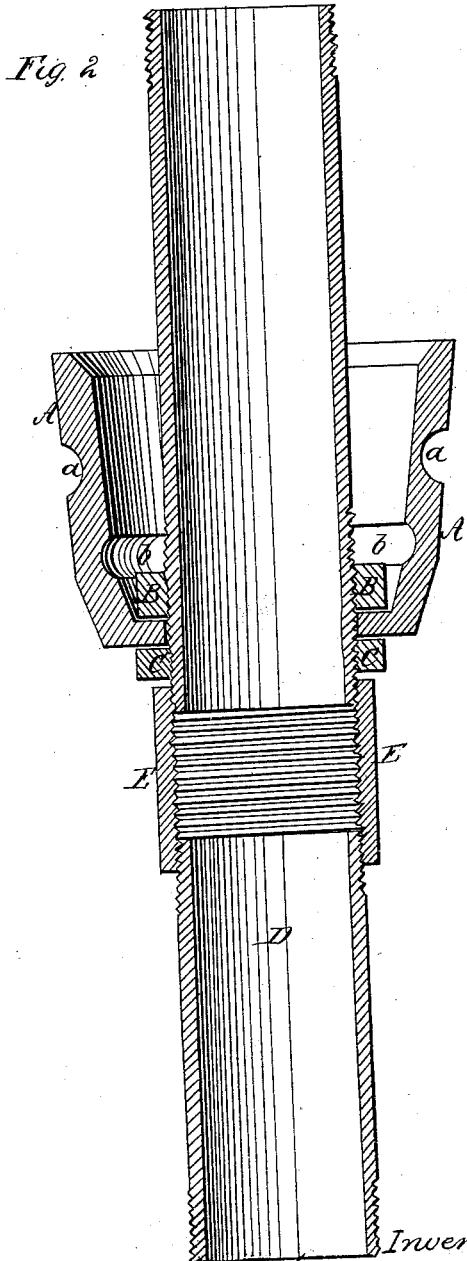

Figure 1 represents an external view of a portion of the tubing of an oil-well with the packing connected to the tube. Fig. 2 represents a section through the same.

Similar letters of reference, where they occur in the separate figures, denote like parts in both drawings.

My invention consists in the peculiar construction of and manner of uniting the rubber cup-packing to the tubing of an oil or other well, where it is desirable to separate the water from the other liquid that is to be pumped up.

To enable others skilled in the art to make and use my invention, I will proceed to describe the same with reference to the drawings.

A represents an india-rubber cup-shaped packing, having a hole through its bottom, so that it may be slipped over the tubing or the tubing through it, as the case may be. Its sides are flaring, so as to approximate or touch the sides of the well. On the outside of the packing, as at $a$, and on the inside, as at $b$, (one or both,) I form a groove or depression in the rubber, for the purpose of allowing it to yield or bend at those points, or either of them, when for any purpose it becomes necessary to draw up the tubing from the well. If these bending or yielding points $a$ $b$ be not used in the rubber packing, their cup shape, flaring outward, jams against the rock and prevents the tubes from being drawn out of the well.

By my plan of indenting the rubber it will bend or yield, or even turn inside out, by the act of drawing up the tubing, and thus avoid one of the principal objections to the use of the rubber packing in the cup form. The object of the cup form is obvious, as the weight of the column of water above it will expand it and force it tight up against the bore or well sides, and thus prevent the water of the upper stratification from mingling with the oil of the lower ones.

At the joint where the tubing is secured together, and where the screw-threads are cut for that purpose, I propose to attach the rubber packing as follows: I first run on a lock-nut, B, and then slip on the rubber packing A and bring it up to the nut B. I then run on a second lock-nut, C, and screw it tight up against the rubber, so that the rubber will serve as a packing between the lock-nuts. I then add another section of tubing, D, and run up the coupling E so as to unite the two. There is thus a packing between the cup and the tube as well as between the tube and the bore of the well, entirely stopping off the water and causing the weight of the superincumbent water to aid in packing the joints, as stated. The lock-nuts hold the packing to the tubing and prevent it from slipping down.

Having thus fully described my invention, what I claim therein as new, and desire to secure by Letters Patent, is—

1. An india-rubber cup-shaped packing having one or more indentations in it, so that it will bend or yield when the tubing for any reason is drawn from the well, and thus prevent jamming, substantially as described.

2. The fastening of such cup-shaped packing to the tubing by clamping its base between lock-nuts screwed onto the tubing, as herein described and represented.

JOHN PARHAM, JR.

Witnesses:
W. W. DOUGHERTY,
THOS. A. TIMMINS.